United States Patent [19]

Polselli

[11] Patent Number: 4,732,190

[45] Date of Patent: Mar. 22, 1988

[54] SHUT-OFF VALVE AND METHOD FOR USING SAME

[76] Inventor: James V. Polselli, 39899 Baroque, Mount Clemens, Mich. 48044

[21] Appl. No.: 833,827

[22] Filed: Feb. 26, 1986

[51] Int. Cl.$^4$ ............................................. F16K 17/24
[52] U.S. Cl. ..................................... 137/460; 137/503
[58] Field of Search ............... 137/460, 498, 504, 503, 137/505.13

[56] References Cited

U.S. PATENT DOCUMENTS

| | | |
|---|---|---|
| 722,355 | 3/1903 | Cain . |
| 1,531,406 | 3/1922 | Meunier . |
| 2,508,399 | 5/1950 | Kendrick . |
| 2,664,101 | 12/1953 | Cano . |
| 2,799,292 | 7/1957 | Pearce ............................ 137/498 |
| 2,923,576 | 2/1960 | Seale ............................ 137/498 X |
| 2,995,337 | 8/1961 | Tanner ........................... 251/282 |
| 3,098,500 | 7/1963 | Gruber . |
| 3,292,655 | 12/1966 | Horowitz . |
| 3,374,803 | 3/1968 | Leveque ........................... 137/503 |
| 3,375,845 | 4/1968 | Behn . |
| 3,434,493 | 3/1969 | Owens ............................ 137/460 |
| 3,568,705 | 3/1971 | Boyadjieff . |
| 3,792,714 | 2/1974 | Miller . |
| 4,004,607 | 1/1977 | Freese ........................... 137/460 X |
| 4,257,448 | 3/1981 | Shiu et al. ..................... 137/498 X |
| 4,415,004 | 11/1983 | Bouteille et al. .................. 137/884 |
| 4,520,902 | 6/1985 | Snow . |
| 4,522,229 | 6/1985 | Van de Moortele .............. 137/460 |
| 4,590,962 | 5/1986 | Tespa ............................ 137/460 X |

FOREIGN PATENT DOCUMENTS

| | | |
|---|---|---|
| 2019573 | 11/1971 | Fed. Rep. of Germany . |
| 2434345 | 1/1976 | Fed. Rep. of Germany ...... 137/503 |
| 6269 | 3/1912 | United Kingdom ............... 137/498 |

OTHER PUBLICATIONS

Lubriquip Product brochure No. 15416, Broken Line Indicator, Jan. 1970.
Trabon and Manzel Product brochure No. 10102, Sep. 1985 Copyright Houdaille Industries, Inc.

Primary Examiner—Martin P. Schwadron
Assistant Examiner—Stephen M. Hepperle
Attorney, Agent, or Firm—John E. Nemazi

[57] ABSTRACT

A valve for automatically shutting off the flow of fluid in the event of a malfunction. The valve is provided with a body having an internal valve cavity in which a valve spool translates. The valve spool serves to control the flow of fluid between and inlet and outlet and is shiftable between an open and a closed position. The inlet and output pressures are monitored by internal ports to sense the occurrence of a malfunction and to automatically shift the valve to the closed position. A reset mechanism is also provided allowing the valve spool to be returned to the open position.

18 Claims, 15 Drawing Figures

SHUT-OFF VALVE AND METHOD FOR USING SAME

BACKGROUND OF THE INVENTION

This invention relates to a fluid shut-off valve and method for using same and more particularly to a shut-off valve which automatically shuts off the flow of fluid in the event of line breakage or blockage. Both mechanical as well as electro-mechanical automatic fluid shut-off valves have been known for some time. It is quite common, for example to install a pressure sensor in a fluid line to detect a high pressure fault caused by blockage or a low pressure fault caused by line rupture. The electrical control device would shut the system down in the event of a malfunction. Mechanical systems have been developed which automatically shut off the line in the event of a malfunction such as the valves shown in U.S. Pat. Nos. 2,508,399; 2,664,101; or 3,568,705. A drawback of prior art mechanical shut-off valves require expensive pressure transducers and expensive reprogramming of the electrical controller.

In industrial applications where many bearing points must be lubricated, it is common to have a single pump for a fluid lubricant servicing many bearing points. In order to carefully meter the lubricant going to each bearing point, it is common to use a divider valve such as the type sold under the trademarks TRABOND-MANZELL ® made by Houdaille Industries and described in product brochure No. 10102 which is incorporated by reference herein. Using one or more divider valves, a large centralized lubrication system can be run off a single pump servicing hundreds of bearing points. A divider valve sequentially directs the output of the pump to each bearing point delivering a predetermined volume of lubricant. If any of the bearing lines plug, the required volume of oil will not be delivered and the divider valve will stop cycling and a high-pressure fault will occur. A single-pressure transducer in the input divider valve can detect highpressure faults in any of the bearing lines. On the other hand, when there is a broken line, the divider valve will cycle normally unaffected by the low pressure in the line extending between the divider valve and the bearing point. It has previously been the practice to install pressure transducers to detect a low-pressure fault caused by a broken line in those lines in which fluid flow is extremely critical. Due to the high cost of pressure transducers and their related control systems, it is frequently not economically feasible to provide an electrical low-pressure fault sensor for each bearing point.

Another type of commonly used industrial lubrication system which needs a shut-off valve is a spray lubrication system sold under the trademark SPINDLE GUARD TM. A spray lubrication system typically uses a metered amount of lubricant which is injected into an air line causing the airlubricant mixture to be sprayed through a nozzle on a bearing point. Due to the compressibility of the air in the line in the event of a clogged nozzle, a high-pressure fault will not be detected by the standard lubrication system sensor since the divider valve will merely continue to pump oil in the clogged line compressing the gas therein.

It is therefore an object of this invention to provide a relatively inexpensive, reliable mechanical automatic shut-off valve for a fluidic system.

It is the further object of the this invention to provide an improved automatic shut-off valve which can be attached directly to a central lubrication system divider block to facilitate easy installation.

It is yet another object of the invention to allow an operator to quickly locate the defective fluid line once a fault has occurred. An important advantage of this invention is to provide an inexpensive mechanical shut-off valve with very few moving parts allowing for a reliable and low-cost valve.

BRIEF DESCRIPTION OF THE INVENTION

Accordingly, the automatic shut-off valve of the present invention includes a body which is provided with a fluid inlet and a fluid outlet. The body has an internal valve cavity into which a valve member translates. The valve member serves to control the flow between the fluid inlet and outlet and is shiftable relative to the body from a first position in which the inlet and outlet are coupled to a second position in which flow is shut off. The valve member is moved in response to the fluid outlet pressure. An outlet pressure port connects the fluid outlet to the first end of the valve. The mechanism for shifting the valve is provided to move the valve from its first position to its second position in response to a change in fluid inlet and outlet pressures indicating a fault has occurred. A reset mechanism is also provided allowing a valve to be returned to the open condition. The invention also includes a method for using a shut-off valve in a fluid system in order to provide an output to indicate a fault has occurred. The method includes installing an automatic shut-off valve in a fluid system to shut off the flow in the event of a broken line. The pressure on the pump input side of the shut-off valve is sensed to determine the occurrence of a high-pressure resulting from the closed shut-off valve. An output is automatically provided indicating a fault has occurred in the event of a high pressure reading.

BRIEF DESCRIPTION OF THE DRAWINGS

FIG. 9 is an exploded perspective view of a divider block and manifold with a broken line shut-off valve sandwiched in between.

DETAILED DESCRIPTION OF THE PREFERRED EMBODIMENT

Several of the preferred embodiments of the invention are illustrated by way of example in FIGS. 1 through 12. With specific reference to FIGS. 1 to 3, an automatic shut-off valve designed to detect a broken line in a centralized lubrication system will be described.

Figure 1:
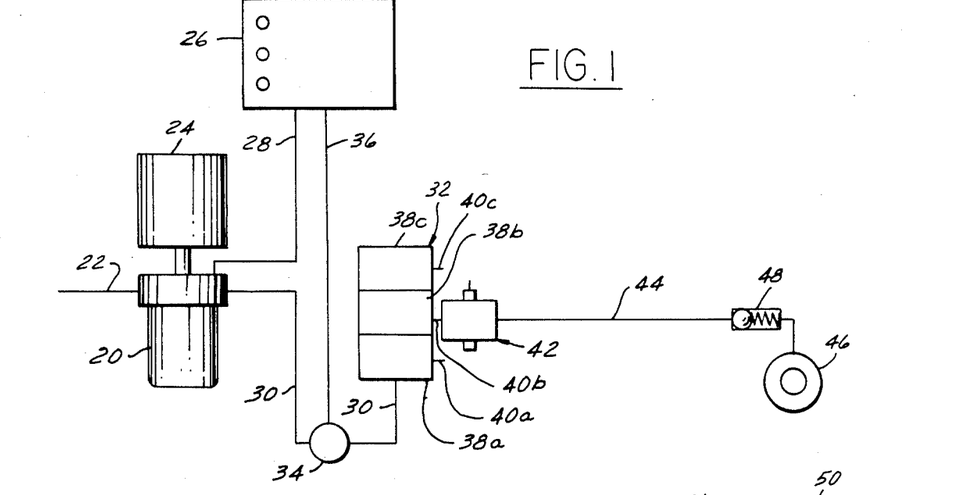
FIG. 1 is a schematic diagram of a central lubrication system employing an automatic shut-off valve and a representative lubrication line.

FIG. 1 shows a centralized lubrication system having a pump/motor assembly 20. The pump/motor assembly is provided with a power input 22 which may be electric or compressed air depending on the pump. Lubricant reservoir 24 is connected to the pump and provides the necessary lubricant for the system. The pump/motor is turned on and off by controller 26 connected to the pump/motor by control signal line 28. When the pump/motor is operating, highpressure lubricant is pumped into main lubricant line 30 which is coupled to the divider block assembly 32. Pressure transducer 34 is mounted in main lube line 30 and provides a pressure signal to controller 26 by way of pressure signal line 36. Divider block assembly 32 as shown is made up of three metering blocks 38a, 38b, 38c.

Although only three metering blocks are shown in the present example, any number of the metering blocks can be used as described in the Houdaille Industries brochure. Each of the metering blocks has a respective output 40a, 40b and 40c. For purpose of this example a bearing point and lubrication lines are only shown in association with the central metering block 38b since the other metering blocks would be similarly fabricated. A metering block output is connected to automatic shut-off valve 42. The output of the automatic shut-off value 42 is connected to individual bearing line 44 which is mounted to the individual device 46 to be lubricated. Note that there is a spring offset one-way check valve 48 affixed in the line immediately adjacent to the lubricated device 46, which prevents the lubricant from leaking out of the line.

In operation, the controller 26 will, at timed intervals, start the pump motor running. The first metering block 38a would then direct the initial fluid out metering block output 40a until the specified volume fluid, 0.010 cu/in for example, has been delivered. After the specified amount of lubricant has been delivered to the first bearing point, then the second metering block 38b would direct a specified amount of fluid out of output 40b. This sequence would continue, lubricating sequentially each of the bearings points until the pump was shut off by the timer in controller 26. The device being lubricated in the FIG. 1 for example would receive periodic short pulses of lubricant. The lubricant would flow through auto shut-off valve 42 to lube line 44, through check valve 48 and ultimately to the device being lubricated 46. As previously discussed if the lube line 44 becomes plugged, the hydraulic block will occur when the divider valve tries to flow a specified volume of oil out of outlet 40b.

When this hydraulic block occurs, a high-pressure fault will be detected by pressure transducer 34 allowing a warning light to be activated and/or the system to be shut down. If line 44 is broken, a low-pressure would occur and the lubricant would merely leak out. When a leak occurs, the auto shut-off valve will cycle causing the metering block output 40b to be plugged which would result in a high-pressure fault being detected by pressure transducer 34. The installation of an auto shut-off valve thereby allows a single pressure transducer in the main lube line to detect both plugged lines as well as broken lines in all of the various lube lines in a multi-bearing point centralized lubrication system.

Figure 2:
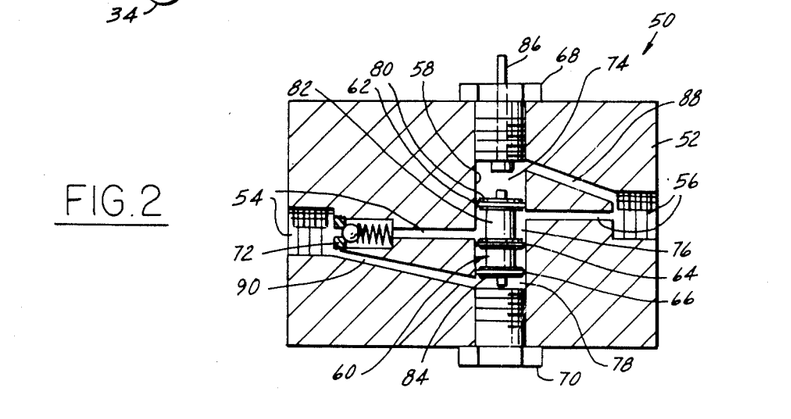
FIG. 2 is a cross-section view of a shut-off valve of the type used in FIG. 1 system employing a push pin reset.

A push pin automatic shut-off valve 50 is shown in cross-section in FIG. 2. Shut-off valve 50 has a body 52 having a fluid input 54, a fluid output 56 and an internal valve cavity 58. Spool valve 60 is sealingly mounted within the valve cavity 58 on three O-ring seals 62, 64 and 66. A top plug 68 and a bottom plug 70 are installed in the valve bodies to plug the ends of valve cavity 58. Inlet port 54 as shown as provided with an internal check valve 72. Inlet 54 as shown in the drawing extends generally horizontally and communicates with valve 58. Outlet port 56 communicates with valve cavity 58 intersecting the cavity at a higher point than the inlet port. The valve spool divides the valve cavity up into several discrete regions, namely a first region 74, central regions 76 and 77, and a second region 78. Valve spool 60 is provided with a first end 80, a central region 82 and a second end 84. The first region 74 of the valve cavity and a second region 78 of the valve cavity will vary in displacement as the valve spool 60 moves up and down in valve cavity 58. It is important to note that the O-rings on the valve spool very tightly fit the walls of the valve cavity resulting in a significant amount of friction resisting spool movement. The top plug 68 is provided with a push pin 86 which sealingly projects therethrough. Upon initial priming of a new machine, the push pin is depressed manually by the operator so that the valve spool assembly 60 can be moved from a first position where the valve would be at its maximum upward travel and the first region volume would be minimized, to a second position where the valve would be at its maximum downward travel as shown in the drawing where the second region volume 78 would be minimized.

With the valve in the second position as shown, lubricant or other fluid coming in inlet 54 can flow through the central region 76 and out of outlet 56. When the system is operating normally, lubricant will slowly flow through the valve and there will be a minimal pressure differential between the first and second region. Note the first region 74 is coupled to the outlet 56 by outlet pressure port 88. The second region 78 of the valve cavity is coupled to the inlet port by inlet pressure port 90. As long as the lube line 44 is in tact, there will be sufficient pressure in the first region 74 to maintain a downward position of spool 60. When a rupture in line 44 occurs there will be lower pressure in first region 74 than second region 78 and the lubricant in first region 74 will be rapidly forced through the shut-off valve. A pressure differential between the first region 74 and the second region 78, causes the valve spool 60 to move upward blocking all further inlet flow. When the valve spool moves upward and comes to the first or stop position, O-ring 64 will lie between the points where input port 54 and output port 56 intersect the valve cavity. After a high-pressure fault occurs, the system is shut down and the operator must depress all of the push pins in order to find the line in which the fault has occurred. All of the good lines will have the valve spool in the second or lower position and the push pin will depress freely. The bad line will have the valve spool 60 in the first or top position and the operator will feel high resistance from that valve spool when the push pin is depressed. The push pin can then be used to manually hold the valve in the lower position while the pump is run manually to allow for the leak to be located.

Figure 3:
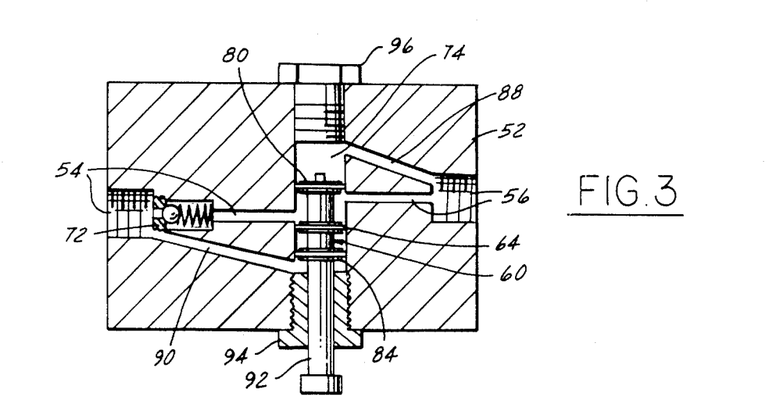
FIG. 3 is a sectional view of a shut-off valve of the type used in the FIG. 1 system utilizing a pull pin reset.

FIG. 3 is an alternatively embodiment of an automatic broken line shut-off valve to be used in a centralized lubrication system or the like similar to that shown in FIG. 1. Rather than using a push pin as shown in FIG. 2, a pull pin 92 is affixed to the valve spool 60 and translates axially therewith. The pull pin 92 sealingly slides through bottom plug 94 and top plug 96 simply plugs the upper end of valve cavity 58. The O-rings in FIG. 3 embodiment can only be tight enough against the valve cavity walls to effectively seal the first, central and second valve cavity regions from one another. Since pull pin 92 significantly decreases the effective cross-sectional area of the second end 84 of the valve, the greater cross-sectional area of the first end of the valve will tend to cause the valve spool to remain in the lower or second position. It is only when the pressure of outlet 56 drops significantly relative to the input pressure will the valve spool with attached pull pin 92 move to the upper or first position causing flow to be obstructed. With the pull pin arrangement, when a fault occurs the operator can visually inspect the automatic shut-off valves to detect the bad line by the position of the pull pin.

In a lubrication system of the type described in FIG. 1 a method of automatic shutting off flow is further described. The method includes the step of installing an automatic shut-off valve in the lubricant system to shut off the flow in the lube line in the event the relationship between the lube line pressure and input line pressure indicates a broken line. The next step is the sensing of the pressure in the lube line prior to the valve to determine the occurrence of a high pressure caused by the closing of the shut-off valve. The final step includes providing an output and indicating a fault has occurred in the event of high pressure at the sensing point.

Figures 4, 5, 6, 7:
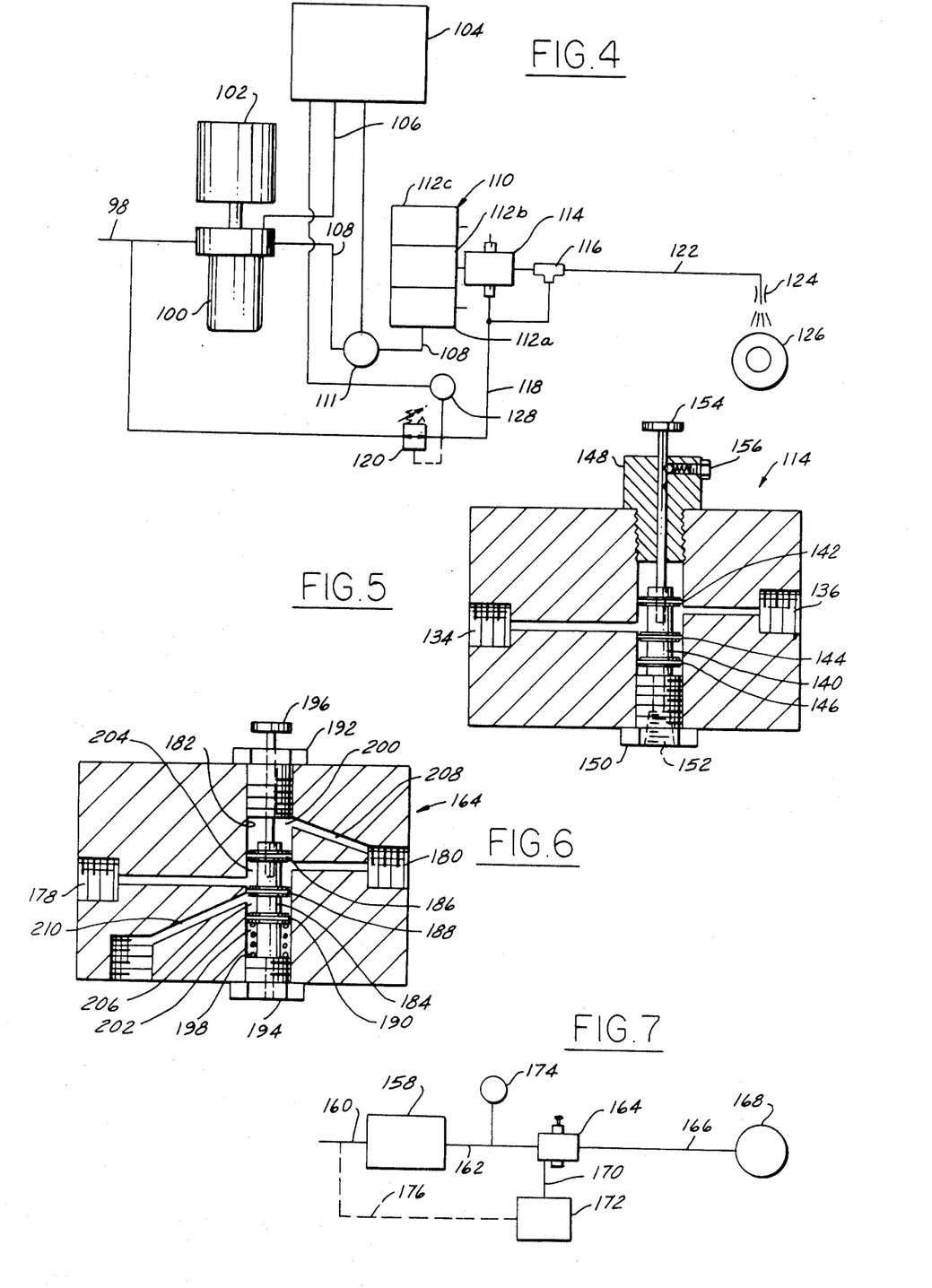
FIG. 4 is a schematic diagram of a spray lubrication system provided with an automatic shut-off valve for detecting a plugged spray nozzle.
FIG. 5 is a sectional view of an automatic shut-off valve of the type utilized in the system shown in FIG. 4.
FIG. 6 is a cross-sectional view of an automatic shut-off valve to detect a broken line in a constant flow system of the type shown in FIG. 7.
FIG. 7 is a schematic view of a constant flow system.

With reference to FIGS. 4 and 5, an alternative embodiment of the automatic shut-off valve adapted to the spray lube system will be described. FIG. 4 is a schematic diagram of a spray lubrication system. The system is basically similar to that shown in FIG. 1. Air line 98 provides a source of power to motor/pump 100 as well as a source of aid for the lubricant spray. Lubricant reservoir 102 provides a source of liquid lubricant to the pump which is controlled by controller 104 attached to the motor pump by control signal line 106. Main lube line 108 connects the output of the pump to divider block assembly 110. Pressure transducer 111 is located in main lube line 108 and provides a pressure signal through pressure signal line 114 to controller 104 to indicate a high pressure fault. The output of the various metering blocks 112a, 112b, and 112c connect to the automatic shut-off valve. The output of the automatic shut-off valve is connected to mixing tee 116 in which oil is mixed with a stream of flowing air. Air is supplied to the mixing tee by air line 118 connected to pressure regulator 120. Pressure regulator 120 provides air to line 118 at approximately 30 psi gauge regulated down from the shop air pressure. Air continuously flows through air line 18 and through mixing tee 116 through lube line 122 through orifice 124 and is sprayed on bearing surface 126. When the lubrication system timer cycles on, the pump will provide oil or other lubricant to the divider blocks which will sequentially in turn provide fixed volumes of lubricant to each of the bearing points. Lubricant will intermittently flow into the mixing tees and this oil will be carried by the air through lube line 122 and be sprayed by orifice 124 onto the bearing surface. If a blocked orifice occurs, there will be an immediate increase in the air pressure since air is continuously flowing through lube line 122. This pressure increase will be sensed by the auto shut-off valve 114 and the flow of lubricant will be stopped thereby resulting in a high pressure fault sensed by pressure sensor 111.

FIG. 5 is a cross-sectional view through auto shut-off valve 114 used in the spray lubrication system of FIG. 4. The valve consists of a body 132 having an input port 134 and an output port 136, both of which intersect central valve cavity 138. A valve spool 140 is sealingly mounted in sliding cooperation with the valve cavity 138 with contact being made by three O-ring seals 142, 144, and 146 axially spaced along the valve spool. The top end of the valve cavity is sealed by top plug 148 and the lower end of the valve cavity is sealed by bottom plug 150. Bottom plug 150 is provided with a remote air pilot port, 152 which is connected to a source of air pressure from line 118 which will regulate the operation of the valve. As seen in FIG. 4, a remote air pilot is connected to air line 118 and the pressure in this line will vary as a function of the pressure set at regulator 120 and the condition of orifice 124, i.e., whether it is clogged or open. The top plug 148 is provided with a central passage therethrough which sealingly cooperates with reset pin 154 which is attached to valves 140 and slideably moves therewith. The reset pin may be held in place by a detent 156 as shown.

In operation, the valve spool is in the lower position as shown in FIG. 5 thereby allowing the input and output port to be coupled together. When a clogged orifice occurs, the increased pressure in line 118 is sufficient to overcome the detent 156 in the valve spool and the reset pin assembly shifts upward causing O-ring 144 to come to rest in between the point where input port 134 and output port 136 intersect the valve cavity thereby preventing inlet flow of oil therebetween and causing a high-pressure fault. To reset the valve to the operative position, reset pin 154 is depressed returning the valve to the lower position as shown. It should be understood that the push pin and detent mechanism is only one of many methods of locating the spool in the valve cavity as a push pin or pull pin of the type shown in FIGS. 2 and 3 could alternatively be used with minor routine modification.

A method of automatically shutting off the flow of lubricant in the event of a clogged nozzle in a SPINDLE GUARD type spray system of the general type shown in FIG. 4 is hereinafter described. The first step of the method includes installation of a pilot activated shut-off valve between the manifold block and the mixing tee to shut off the flow of lubricant between the mixing tee and the spray nozzle in the event the valve input pressure increases sufficiently to indicate that the nozzle has become plugged. The next step includes the coupling of the lubricant line pressure between the mixing tee and the spray nozzle to the shut-off valve pilot port to automatically shift the valve to the closed position in the event the nozzle becomes plugged. The next step includes the sensing of pressure in the lubricant input line prior to the shut-off valve in order to determine the occurrence of a high-pressure fault caused by the closing of the shut-off valve. The final step including the providing of an output indicating that a fault has occurred upon the occurrence of a high-pressure reading.

FIGS. 6 and 7 show an alternative embodiment of the shut-off valve designed for use in a constant flow system. Note, that the constant flow-type valve can be used for any type of fluid from air to thick grease, and that the output flow could be used to lube a bearing or extend and retract an actuator. Typically, the exhaust port would be connected to the reservoir or, alternatively, the exhaust port could be plugged. As can be seen in the FIG. 7 schematic, pump 158 is provided with a pump input 160 and pump output 162. Pump output 162 is coupled to the input of the automatic shut-off valve 164. The shut-off valve is provided with an output which flows through lubrication line 166 to the ultimate bearing point 168. The shut-off valve is provided with an exhaust which is coupled to exhaust line 170. During normal operation lubricant or other fluid flows from the pump through the valve into the bearing point. When a broken line occurs, the pressure at the output of the shut-off valve will drop causing the valve to automatically close and the pump output redirected to exhaust line 170. This exhaust line can be attached to a closed accumulator, partially filled with compressed gas so that when the valve shuts off, flow will be redirected to the accumulator causing the pressure in line 162 to gradually build up until pressure transducer 174 shuts off the pump.

An accumulator would be necessary for high-flow, high-horsepower systems as shutting off suddenly would cause shock. If a pressure spike is not a problem, exhaust line 170 can be merely plugged at the valve. An alternative to accumulator 172 would be to route the exhaust back to the pump input 160 as shown by exhaust return line 176. In order to obtain a pressure increase at the transducer 174 to indicate a fault, exhaust return line 176 would have to be sized to offer greater resistance to flow than lube line 166.

FIG. 6 shows a cross-section of constant flow broken line shut-off valve 164. Valve 164 is provided with an input port 178 and output port 180 and a valve cavity 182. Valve spool 184 is sealingly mounted in valve cavity 182 on three O-rings 186, 188, 190. The top end of the valve cavity is sealed by a top plug 192 and the bottom end is sealed by bottom plug 194. Push pin 196 sealingly projects through and slides relative to top plug 196 and is affixed to the valve spool 184. The valve shown in FIG. 6 has the spool in the extreme lower end of its travel with the spool engaging bottom plug 194 and the input and output free to communicate with one another. The valve cavity is divided into four regions by the valve spool and the three O-rings mounted thereon. A first region 200 above the valve, a second region 202 below the valve into which spring 198 is mounted, a flow region 204 generally between O-rings 186 and 188 and an exhaust region 206 between O-rings 188 and 190. With the valve in the open position as shown the valve spool is bottomed against the bottom plug 194 and flow enters input port 178, flows through flow region 204 and exits through output port 180. During normal operation of the system there will be sufficient pressure in the output port 180 so that the first region 200 which is connected to the output port by pressure port 208 will exert sufficient downward force on the valve spool to overcome the force of spring 198.

When a leak occurs in the lube line 166 the pressure in output port 180 will drop allowing spring 198 to move the valve spool push pin assembly upward causing O-ring 186 to come to a stop position blocking the flow between the inlet port and outlet port. In the stop position both the inlet port 178 and the exhaust port 210 will communicate with the exhaust region 206 and flow coming in the input port will exit through the exhaust port. To cause a fault (high-pressure) the exhaust port would be omitted or plugged.

In operation before the pump is turned on the valve will be in the closed position. Push pin 196 will be depressed and held down until lube line 166 is filled with lubricant and pressurized, until such time the push pin may be released by the operator and the valve maintained in the open position by the pressure in the lube line acting on first region 200 and output port.

The valve and system described and shown in FIGS. 6 and 7 are used in establishing a method for automatically shutting off the flow of fluid in the event of a broken line in a constant flow fluid system provided with a fluid pump and a fluid line. The method includes the step of installing an automatic shut-off valve in the fluid line, the valve having a valve body with an internal cavity and a valve spool mounted therein to define a first region which varies in displacement, function and valve position. The valve is spring-biased with the closed position with the first region is a minimum volume and is manually shiftable to an open position with a first region has a maximum volume. The first region is maintained at the pressure of the fluid output line extending from the valve. The next step includes turning on the pump to establish a high pressure at the valve inlet. The next step includes manually shifting the spool to the open position and holding the valve open until the fluid line pressure and the corresponding pressure in the first region have increased sufficiently to maintain the valve spool open. The method further includes automatically closing the valve in the event of low pressure in the fluid line caused by a broken line, sensing the pressure in the fluid line between the pump and shut-off valve and indicating a fault in the event the sensed pressure becomes higher than normal.

Figures 8A, 8B, 8C, 8D:
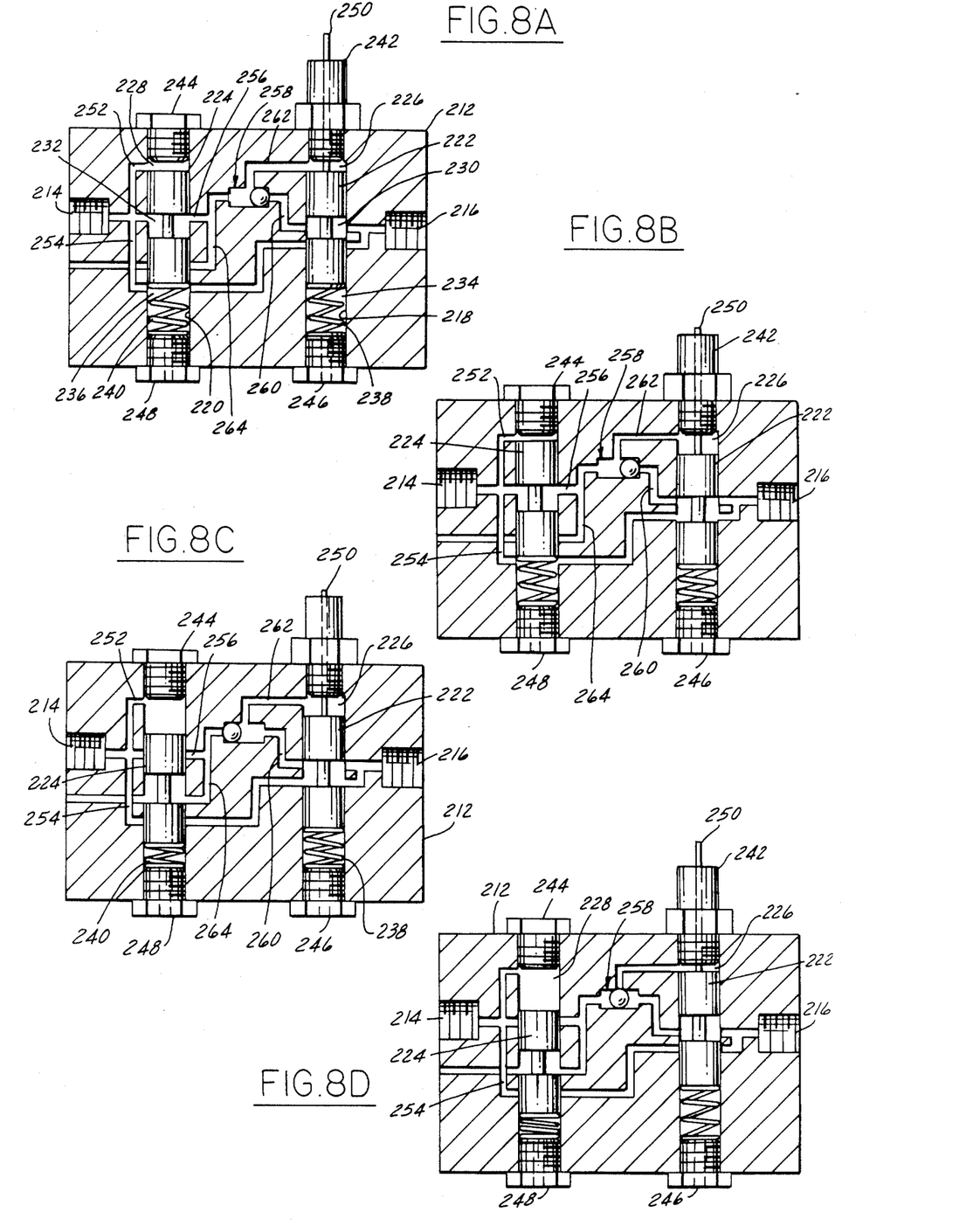
FIGS. 8a through 8d show an automatic shut-off valve with an automatic reset with valve spools in various positions.
Figure 9:
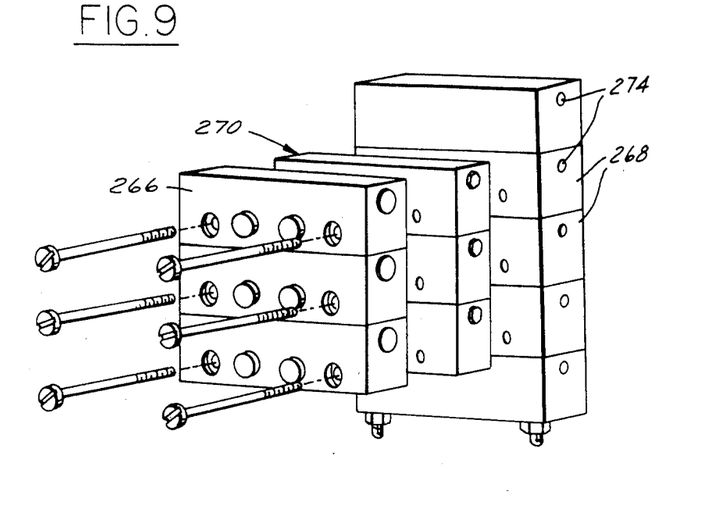
Figure 10:
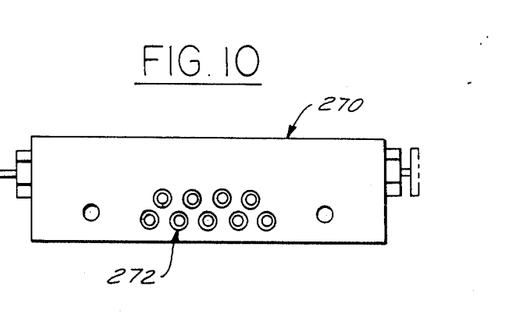
FIG. 10 is an end view of the broken line shut-off valve depicted in FIG. 9.
Figure 11:
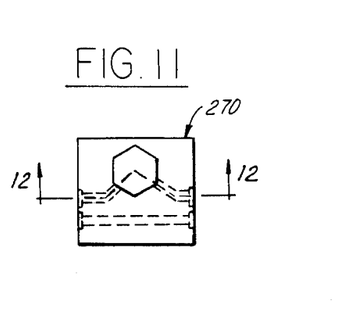
FIG. 11 is a right side elevation of the valve shown in FIG. 10.

FIG. 8a through 8d show cross-sectional views taken through an alternative embodiment of the invention provided with automatic reset feature. For purpose of explanation, drawings depicting each of the various combinations of spool position have been provided. In FIG. 8a the valve is shown in the initial start position. The valve is provided with a body 212 and input port 214 and output port 216, a main valve cavity 218, a reset valve cavity 220, a main valve spool 222, a reset valve spool 224. Both valve spools are generally spool-shaped having an enlarged top and bottom ends and a small central region and sealingly mount in and slidable axially relative to their respective valve cavities. As shown the valve spools are ground steel carefully fitted to lapped bores with only a few ten-thousandths of an inch clearance. This configuraation is suited for very high-pressure or high-temperature systems. In most applications a molded plastic spool with O-ring seals as shown in the earlier embodiments would work satisfactorily.

Each valve divides the respective valve cavity, a top or first region 226 and 228, a central region 230 and 232 and a second region 234 and 236. Both the first and second regions vary in displacement as a function of valve position within the valve cavity. When the valves are in the first position as shown in FIG. 8a, first regions 226 and 228 in the main valve and reset valve respectively are at their minimum volume and second regions 234 and 236 in the main cavity and reset cavity respectively are at their maximum volumes. Both the main valve and reset valve are maintained biased in the up or first position by mainspring 238 and reset spring 240. As can be seen in FIG. 8a, the main cavity and reset cavity have both ends plugged by top plugs 242 and 244 and bottom plugs 246 and 248. The bottom plugs are drilled/vented to atmosphere so that internal leakage or oil into the lower cavities would not build up and block all movement of spools.

The top plug in the main cavity is provided with an axial bore therethrough into which sealingly fits flag 250 which is affixed to main valve 222. The valves as shown in FIG. 8a are in their initial starting position with both the main valve and reset valve in the up or first position. When inlet port 214 is pressurized, reset port 252 which communicates with the first region of the reset cavity 228 will likewise be pressurized. Main port 254 which communicates with inlet port 214 will likewise be pressurized. However, this port is initially obstructed by main valve 222 (note main port 254 extends behind reset cavity 220 and does not intersect reset port). With the reset valve in the initially up position, central region of the reset valve 232 is aligned with input port 214 allowing fluid to flow past the valve to check valve input inlet 256. Check valve 258 is a two-way check having one output and two inputs; one coupled to check valve input inlet 256 and the other coupled to check valve output inlet port 260. (Note, Port 260 extends behind the main valve cavity and connects to the fluid outlet.) Check valve outlet port 262 connects the outlet of the check valve to the first region of the valve cavity 226. Therefore, as can be seen in FIG. 8a, when the valve is initially pressurized, the check valve will cycle to the right connecting the input inlet 256 of the valve to output 262, thereby pressurizing both the first region 226 of the main cavity and the first region 228 of the reset cavity. Note, check valve exhaust port 264 is initially blocked by the reset valve spool 224 which is in its upward position.

After the valve is pressurized the main valve 222 will move to its second or bottom position as shown in FIG. 8b. Main spring 238 is slightly weaker than reset spring 240 causing main valve 222 to cycle downward before the reset valve will cycle downward. Once the main valve is in the bottom position as shown in FIG. 8b, pressure is built up in region 228 which shifts valve 224 downwards and fluid can flow through the central region and out of outlet 216. Once the lube line attached to output 216 has become full of lubricant and pressurized, pressure in port 260 will reach a pressure level sufficient to cause the main valve to remain in its second or bottom position as shown in FIG. 8c.

Once both the main valve and reset valve have cycled to their bottom position, the valves will be in their normal open position and oil will come in the inlet, flow through the main port past the main valve and out the outlet. When the reset valve is in its second position, check valve input inlet port 256 is blocked by the reset valve and the check valve exhaust port 264 which formerly was closed is now open allowing a small amount of fluid in the check valve inlet input port to escape as the check valve cycles to the left as shown. With the check valve in the left position, the first region of the main valve cavity 226 is maintained at the output pressure of outlet port 216 by way of check valve output inlet 260 and check valve output 262. As long as pressure is maintained in the output line coupled to output port 216, both valves may be in the down position and fluid will flow through the valve. In the event of a break or leak in the output line, the pressure in port 216 will drop and the main valve will cycle to the first top position as shown in FIG. 8d. The fluid formerly in the first region of the reset valve flows through check valve output 262 and check valve output valve 260 and exhaust through valve output 216. It is important to note that the reset valve stays in the down position when a leak occurs. This is due to the fact that inlet oil pressure in region 228 is sufficient to maintain the valve 224 downward once it has shifted downward. With the main valve in the top position, main port 254 becomes plugged by the main valve 222 and the check valve input inlet is plugged by the reset valve which is still in the bottom position, thereby blocking all flow through the valve.

After a leak occurs the valve will be maintained in the shut-off position as long as input 214 remains pressurized. The operator can readily detect a fault by the position of the flag 250 extending through main top plug 242. If the system is shut down and depressurized, the reset valve will cycle to the top position as shown in FIG. 8a. If the pump is restarted and the system repressurized prior to fixing the leak, the valve will go through the above-described cycle and the valve will shut itself off after only allowing a small amount of fluid to flow through the valve. It is not necessary for the output 216 to become pressurized in order for the reset spool to recycle in the bottom position. The main valve will cycle down to the main port 256, but without a good output line, no pressure will flow through check valve 258 to the region 222 to maintain the downward position of the main spool. Reset valve spool will then cycle downward and ultimately reach its bottom position even with a leaking output line (although it will cycle slower than it would cycle downward with a good line) at which time the check valve exhaust port will be opened causing the main piston to cycle up to the first position. Since there is a leak, the output port 216 does not have enough pressure to cause check valve 258 to shift to the left thereby trapping the main valve spool down. In a system provided with automatic high-pressure fault shut-off, the operator, in order to diagnose which line is bad will have to manually run the system for a short period of time allowing all of the flags 250 to cycle down and watching for the flag on the bad line to pop up when the valve goes into the shut off position as shown in FIG. 8d.

Figure 12:
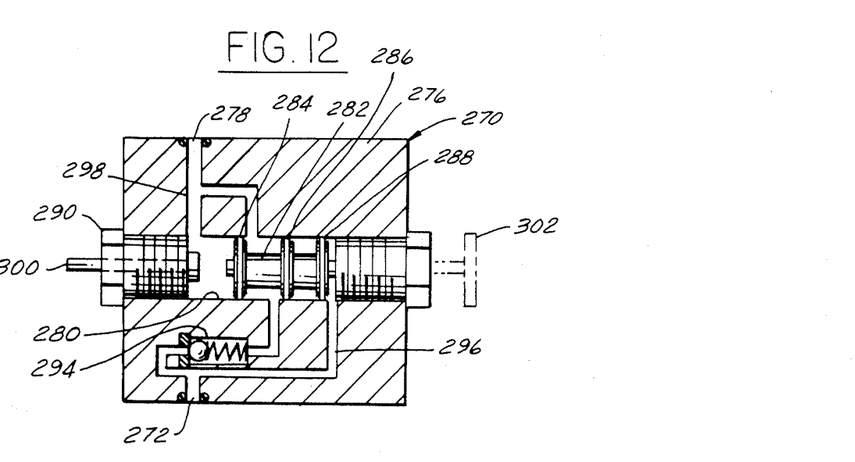
FIG. 12 is a compound sectional view taken along line 12—12 of FIG. 10 showing the internal porting and valve arrangement.

An embodiment of the invention which functions similar to valve shown in FIGS. 1-3 is depicted in FIGS. 9-12. The embodiment in FIGS. 9-12 is specifically designed for integral installation with an existing divider block without necessitating the breaking of fluid lines and the time-consuming fitting of a valve in the lube line by a pipefitter. The embodiment of the invention as shown in FIGS. 9-12 may be simply installed by removing a feeder block 266 from the accompanying manifold segment 268 by removing two screws. The feeder block is then reinstalled with long screws, with a broken line shut-off valve 270 sandwiched between the feeder block and the manifold segment. There are a number of passageways interconnecting the feeder block and the manifold in the embodiment shown in FIG. 10. There are 9 passageways interconnecting the feeder block and manifold, 8 of which will be machined as through holes through shut-off valve 270 and the one passageway which is the output passageway 272 which is coupled to the manifold outlet 274, is routed through the internal portion of the shut-off valve as depicted in the section view in FIG. 12. The operation of the valve shown in FIG. 12 is similar to that shown in FIGS. 1–3. The valve is provided with a body 276 and input 272 which corresponds to the feeder block output and output 278 which corresponds to the manifold inlet not shown. The valve is provided with an internal cavity 280, a valve spool 282, O-rings 284, 286, 288, top plug 290, bottom plug 292, check valve 294, inlet pressure port 296, outlet pressure port 298 and finally a push pin 300 or alternatively a pull pin 302 which would cooperate with the valve spool for resetting same. FIG. 12 valve would function in the identical manner as the valves in FIGS. 2 or 3, the only difference being that the valve is fabricated in a small compact unit specifically designed to fit between a feeder block and a manifold in a centralized lubricating system of the type generally shown in FIG. 1 and previously described.

The automatic shut-off valve shown in FIGS. 9–12 when used in a system of the type shown in FIG. 1 can accomplish a method of automatically shutting off the flow of lubricant in the event of a broken line in a modular divider block lubrication system. The system would include a lubricant pump, an input line, pressure sensor, manifold block, a feeder block and a lube line. In the method previously described in association with FIG. 1, included installing the automatic shut-off valve sensing the pressure and providing an output to indicate the fault. The step of inserting the automatic shut-off valve of the type shown in the FIG. 9–12 embodiment would further include the removing of the feeder block from the manifold, inserting a sandwich type automatic shut-off valve between the feeder block and manifold, and then reinstalling the feeder block to the manifold sandwiching the automatic shut-off valve therebetween. The method can also include the final step of turning off the pump in the event of a high-pressure fault.

It will also be understood, of course, that while the form of the invention herein shown and described constitutes a preferred embodiment of the invention, it is not intended to illustrate all possible forms thereof. It will also be understood that the words used are words of description rather than limitation and various changes may be made without departing from the spirit and scope of the invention disclosed.

I claim:

1. Automatic shut-off valve for controlling the pulsating flow of fluid in a line, comprising:
   (a) a body having a formed therein:
   a valve cavity having a first end, a second end, and central region;
   a fluid input port having a fluid inlet coupled to a source of intermittingly pulsating fluid and a fluid output port having a fluid outlet coupled to the line, both fluid input and fluid output ports communicating with the valve cavity central region;
   an outlet pressure port connecting the valve cavity first end to the fluid outlet; and
   an inlet pressure port connecting the valve cavity second end to the fluid inlet;
   (b) valve means for controlling flow between the fluid input and output ports, said valve means sealingly cooperating with the valve cavity and shiftable relative thereto from an open position in which the input and output ports are coupled to a closed position where said flow is shut-off; and
   (c) a normally closed check valve placed between the fluid inlet and the fluid outlet, downstream of the inlet pressure port and upstream of the outlet pressure port, said check valve opening in response to the incoming pulsating fluid flow, and closing thereafter to prevent backflow through said valve; whereby the shut-off valve will normally transmit liquid from the fluid inlet to the fluid outlet passing through the check valve, input port, valve cavity central region and output port, resulting in a pulsating pressure in both the first and second ends of the valve cavity such that the valve means is maintained in the open position, said valve means shifting to the closed position in the event of a broken link resulting in a reduction in the fluid pressure causing the valve means to shift to the closed position due to the increase pressure in the valve cavity second end from the check valve restriction.

2. The invention of claim 1 wherein:
said valve cavity further comprises an enclosed, generally cylindrical cavity; and
said valve means further comprises a generally cylindrical shaped spool which sealingly cooperates with said valve cavity and is shiftable relative thereto thereby defining a first region and a second region bounded by the valve cavity and the valve spool with the first region corresponding to the valve cavity first end and the second region corresponding to the valve cavity second end, both of which vary in displacement as a function of valve position within the cavity.

3. The invention of claim 2 further comprising a plurality of seals mounted on the periphery of the valve spool and spaced axially from each other to define at least one central region for coupling the input and output port when the valve spool is in the open position.

4. The invention of claim 3 further comprising at least three seals mounted on the periphery of the valve spool thereby defining two central regions, a flow region for coupling the input and output port when the valve spool is in the open position and a shut-off region for separating the input and output port when the valve is in the closed position.

5. The invention of claim 3 wherein said seals are sized relative to said valve spool and said cylindrical cavity to create sufficient friction to allow the valve to stick in the cylindrical cavity until the output pressure is low enough relative to the input pressure to indicate a malfunction has occurred.

6. The invention of claim 2 wherein said reset means further comprises a pull pin sealingly cooperating with the valve body and shiftable relative thereto, said pull pin having a first end external of the valve body and a second end affixed to the valve spool so that the valve spool and pull pin move in unison relative to the valve body, said pull pin further causing the effective area in the second region of the valve cavity exposed to the spool to be reduced by the area of the pull pin.

7. The invention of claim 6 wherein the cross-sectional area of pull pin is approximately one-half of the cross-sectional area of valve spool.

8. The invention of claim 1 wherein said reset means further comprises a push pin slidably shiftable relative to the body projecting into the first end of the valve cavity for intermittant engagement with the valve spool to shift same to the open position.

9. The invention of claim 8 wherein said seals are sized relative to said valve spool and said cylindrical cavity to create sufficient friction to allow the valve to stick in the cylindrical cavity until the output pressure is low enough relative to the input pressure to indicate a malfunction has occurred.

10. The invention of claim 1 further comprising a pull pin cooperating with the valve means and the body, said pull pin projecting sealingly outward of the body through the valve cavity second end to thereby reduce the effective area thereof.

11. An automatic broken line shut-off valve for attachment to a feeder block in a pulsating flow modular divider valve system for controlling the feeder block output, said shut-off valve comprising;

(a) a body provided with:

a valve cavity having a first end, a second end, and a central region;

a fluid input port having a fluid inlet for communicating with the feeder block output, and a fluid output port having a fluid outlet, both input and output ports communicating with said valve cavity central region;

an outlet prepssure port connecting the first end of the valve cavity to the fluid output port; and an inlet pressure port connecting the second end of the valve cavity to the fluid inlet;

(b) valve means within the valve cavity for controlling the flow of liquid between inlet and output ports, said valve means sealingly cooperating with the valve cavity and shiftable relative thereto from an open position in which the input and output ports are coupled to a closed position where said flow is shut off;

(c) a normally closed check valve placed between the fluid inlet and the fluid outlet, downstream of the inlet pressure port and upstream of the output pressure port, said check valve opening in response to the incoming pulsating fluid flow, and closing thereafter to prevent backflow through said valve; and (d) reset means for moving the valve means back to the open position.

12. The invention of claim 11 wherein:

said valve cavity further comprises an enclosed, generally cylindrical cavity; and said valve means further comprises a generally cylindrical shaped spool which sealingly cooperates with said valve cavity and shiftable relative thereto to define a first region and a second region bounded by the valve cavity and the valve spool, with the first region corresponding to the valve cavity first end and the second region corresponding to the valve cavity second end, both of which vary in displacement as a function of valve position within the cavity.

13. The invention of claim 12 wherein said reset means further comprises a push pin slidably shiftable relative to the body projecting into the first end of the valve cavity for intermittent engagement with the valve spool to shift same to the open position.

14. The invention of claim 12 further comprising a plurality of seals mounted on the periphery of the valve spool and spaced axially from each other to define at least one central region for coupling the input and output port when the valve spool is in the open position.

15. The invention of claim 14 further comprising at least three seals mounted on the periphery of the valve spool thereby defining two central regions, a flow region for coupling the input and output port when the valve spool is in the open position and a shut-off region for separating the input and output port when the valve is in the closed position.

16. The invention of claim 12 wherein said seals are sized relative to said valve spool and said cylindrical cavity to create sufficient friction to allow the valve to stick in the cylindrical cavity until the output pressure is low enough relative to the input pressure to indicate a malfunction has occurred.

17. The invention of claim 11 wherein said body is further provided with a plurality of through holes for allowing a plurality of inner connecting fluid passageways in the feeder block and the manifold block to be coupled to one another with the fluid shut-off valve installed therebetween.

18. The invention of claim 11 wherein said reset means further comprises a pull pin cooperating with the valve means and the body, said pin projecting outwardly of the body through the second end of the valve cavity to thereby reduce the effective area thereof, whereby the shut-off valve will normally pass the liquid from the fluid inlet to the fluid outlet through the check valve, input port, valve cavity central region and output port, resulting in a pulsating pressure in both the first and second ends of the valve cavity such that the valve means is maintained in the open position, said valve means shifting to the closed position in the event of a broken line resulting in a reduction of fluid pressure in the valve cavity first and causing the valve means to shift the closed position as a result of the increased pressure in the valve cavity second and from the check valve and the reduced effective area caused by the pull pin.

* * * * *

UNITED STATES PATENT AND TRADEMARK OFFICE
CERTIFICATE OF CORRECTION

PATENT NO.  : 4,732,190

DATED       : March 22, 1988

INVENTOR(S) : James V. Polselli

It is certified that error appears in the above-identified patent and that said Letters Patent is hereby corrected as shown below:

In the Claims

In claim 1, column 11, line 49, please delete the word "a" immediately following the word "having".

In claim 11, column 13, line 20, please delete the word "prepssure" and insert in its place the word ---pressure---.

In claim 11, column 13, line 33, please delete the word "output" and insert in its place the word ---outlet---.

Signed and Sealed this

Twenty-third Day of August, 1988

Attest:

DONALD J. QUIGG

*Attesting Officer*     *Commissioner of Patents and Trademarks*